United States Patent
Stacey

(10) Patent No.: US 9,602,635 B2
(45) Date of Patent: Mar. 21, 2017

(54) WIRELESS DEVICE, METHOD, AND COMPUTER READABLE MEDIA FOR COMPRESSED MEDIA ACCESS CONTROL HEADER

(71) Applicant: Intel IP Corporation, Santa Clara, CA (US)

(72) Inventor: Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/573,111

(22) Filed: Dec. 17, 2014

(65) Prior Publication Data

US 2016/0119451 A1    Apr. 28, 2016

Related U.S. Application Data

(60) Provisional application No. 62/068,849, filed on Oct. 27, 2014.

(51) Int. Cl.
*H04L 1/00*      (2006.01)
*H04L 29/06*    (2006.01)
*H04L 29/08*    (2006.01)

(52) U.S. Cl.
CPC .............. *H04L 69/22* (2013.01); *H04L 69/04* (2013.01); *H04L 69/324* (2013.01)

(58) Field of Classification Search
CPC ... H04W 28/06; H04W 84/12; H04W 28/065; H04W 52/0219; H04W 74/04;
(Continued)

(56) References Cited

U.S. PATENT DOCUMENTS

2007/0153757 A1    7/2007   Kim et al.
2011/0286378 A1    11/2011  Kim et al.
(Continued)

FOREIGN PATENT DOCUMENTS

EP       1735932 A2    12/2006
TW    201616835 A     5/2016
(Continued)

OTHER PUBLICATIONS

"International Application Serial No. PCT/US2015/050488, International Search Report mailed Jan. 12, 2016", 3 pgs.
(Continued)

*Primary Examiner* — Dady Chery
(74) *Attorney, Agent, or Firm* — Schwegman Lundberg & Woessner, P.A.

(57) ABSTRACT

Wireless device, method, and computer readable media for compressed media access control header and/or compressed acknowledgement are disclosed. The wireless device may include circuitry configured to transmit a media access control (MAC) protocol data unit (MPDU) delimiter with a field that indicates a subsequent MAC header is a compressed MAC header, and transmit a compressed MAC frame with the compressed MAC header. The compressed MAC header does not include one or more of the following group: duration, receive address, and transmit address. The circuitry may be further configured to receive a schedule in a transmission opportunity and receive a second compressed MAC frame. The circuitry may be further configured to determine that the receive address field is an address of the HEW device based on the schedule and determine that the receive address field is an address of an access point that transmitted the schedule based on the schedule.

21 Claims, 7 Drawing Sheets

(58) Field of Classification Search
CPC .............. H04W 28/04; H04W 28/044; H04W 52/0216; H04W 72/005; H04W 72/042; H04W 72/14; H04W 74/06; H04W 48/00; H04W 52/0203
USPC .......................... 270/392, 311, 328, 329, 338
See application file for complete search history.

(56) References Cited

U.S. PATENT DOCUMENTS

| | | |
|---|---|---|
| 2013/0107895 A1 | 5/2013 | Wentink |
| 2014/0105201 A1 | 4/2014 | Seok |
| 2014/0233551 A1* | 8/2014 | Wentink ................ H04L 1/1621 370/338 |

FOREIGN PATENT DOCUMENTS

| | | |
|---|---|---|
| WO | WO-2006041673 A | 4/2006 |
| WO | WO-2009145585 A2 | 12/2009 |
| WO | WO-2016069128 A1 | 5/2016 |

OTHER PUBLICATIONS

"International Application Serial No. PCT/US2015/050488, Written Opinion mailed Jan. 12, 2016", 8 pgs.
"Taiwanese Application Serial No. 104129543, Office Action mailed Jul. 4, 2016", W/ English Search Report, 7 pgs.

* cited by examiner

BSS

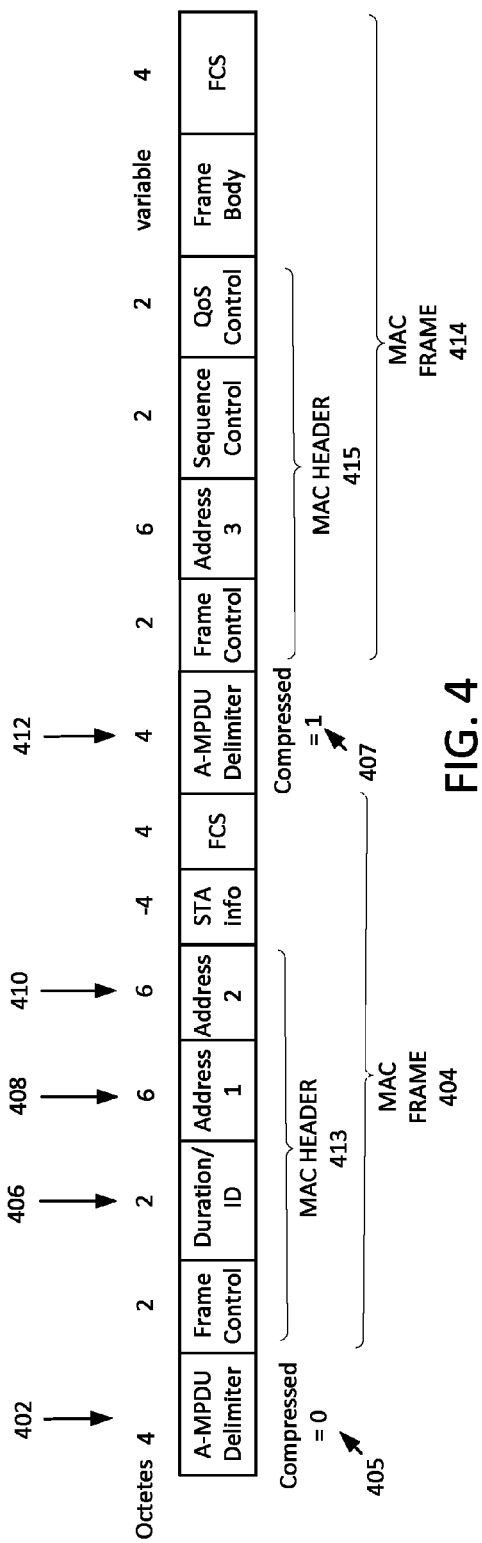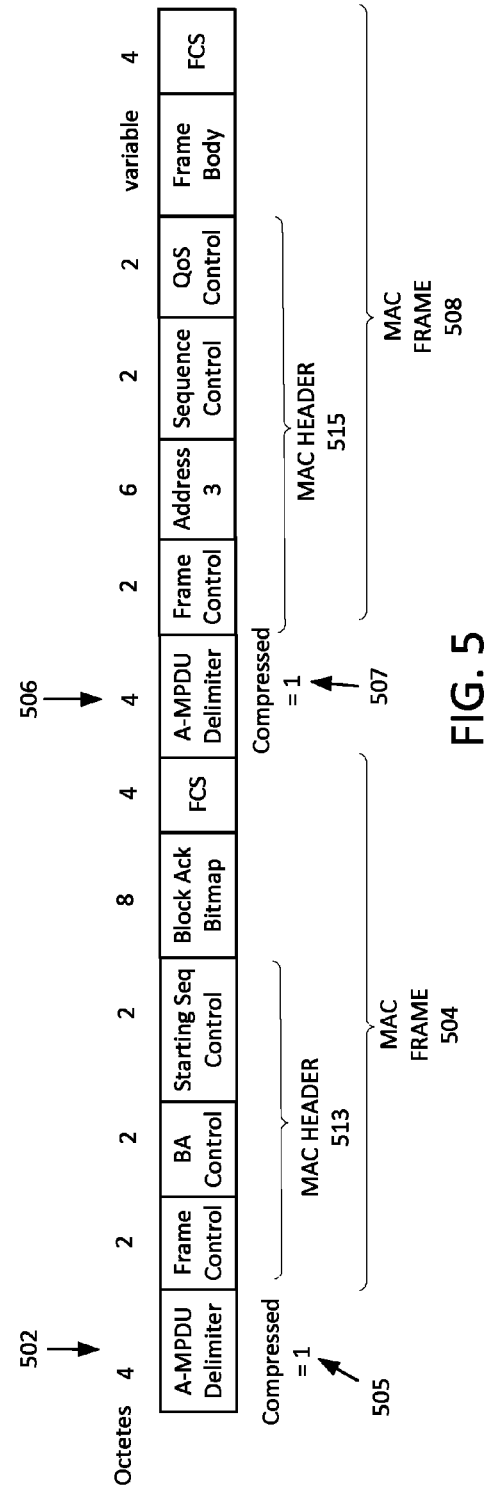

| Data Rate | 1.5 ms payload size/ % overhead of 28 bytes | 2.0 ms Payload size/ % overhead of 28 bytes | 3.0 ms Payload size/ % overhead of 28 bytes |
|---|---|---|---|
| 750 kbps (e.g. MCSO in 2.5 MHz) | 140B /20 % | 186B/ 15% | 281B/ 10% |
| 1.5 Mbps | 281B/ 10 % | Etc. | |
| 3.0 Mbps | 562B /5% | | |

FIG. 8

WIRELESS DEVICE, METHOD, AND COMPUTER READABLE MEDIA FOR COMPRESSED MEDIA ACCESS CONTROL HEADER

PRIORITY CLAIM

This application claims the benefit of priority under 35 USC 119(e) to U.S. Provisional Patent Application Ser. No. 62/068,849, filed Oct. 27, 2014 which is incorporated herein by reference in its entirety.

TECHNICAL FIELD

Embodiments pertain to wireless communications. Some embodiments relate to media access control (MAC) headers and acknowledgments in wireless local-area networks (WLANs). Some embodiments relate to compressed MAC headers and acknowledgments. Some embodiments relate to compressed MAC headers and acknowledgements in 802.11, and some embodiments to compressed MAC headers and acknowledgments in 802.11ax.

BACKGROUND

One issue with communicating data over a wireless network is transmitting and receiving packets that may include information other than the actual data. The overhead data may affect the efficiency of the use of the wireless medium.

Another issue with communicating data over a wireless network is that often more than one standard may be in use in a wireless local-area network (WLAN). For example, Institute of Electronic and Electrical Engineers (IEEE) 802.11ax, referred to as high efficiency wireless local-area network (HEW) may need to be used with legacy versions of IEEE 802.11.

Thus there are general needs for systems and methods that allow for reduced overhead. There are also general needs for systems and methods that allow HEW devices to coexist with legacy devices.

BRIEF DESCRIPTION OF THE DRAWINGS

FIG. 4 illustrates two MAC packets and two MPDU delimiters according to example embodiments;

FIG. 5 illustrates a block acknowledgement with a compressed MAC header and data with a compressed MAC header according to example embodiments;

FIG. 8 illustrates a table indicating the performance gain when overhead is reduced by 28 bytes for various data rates and payload durations according to example embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
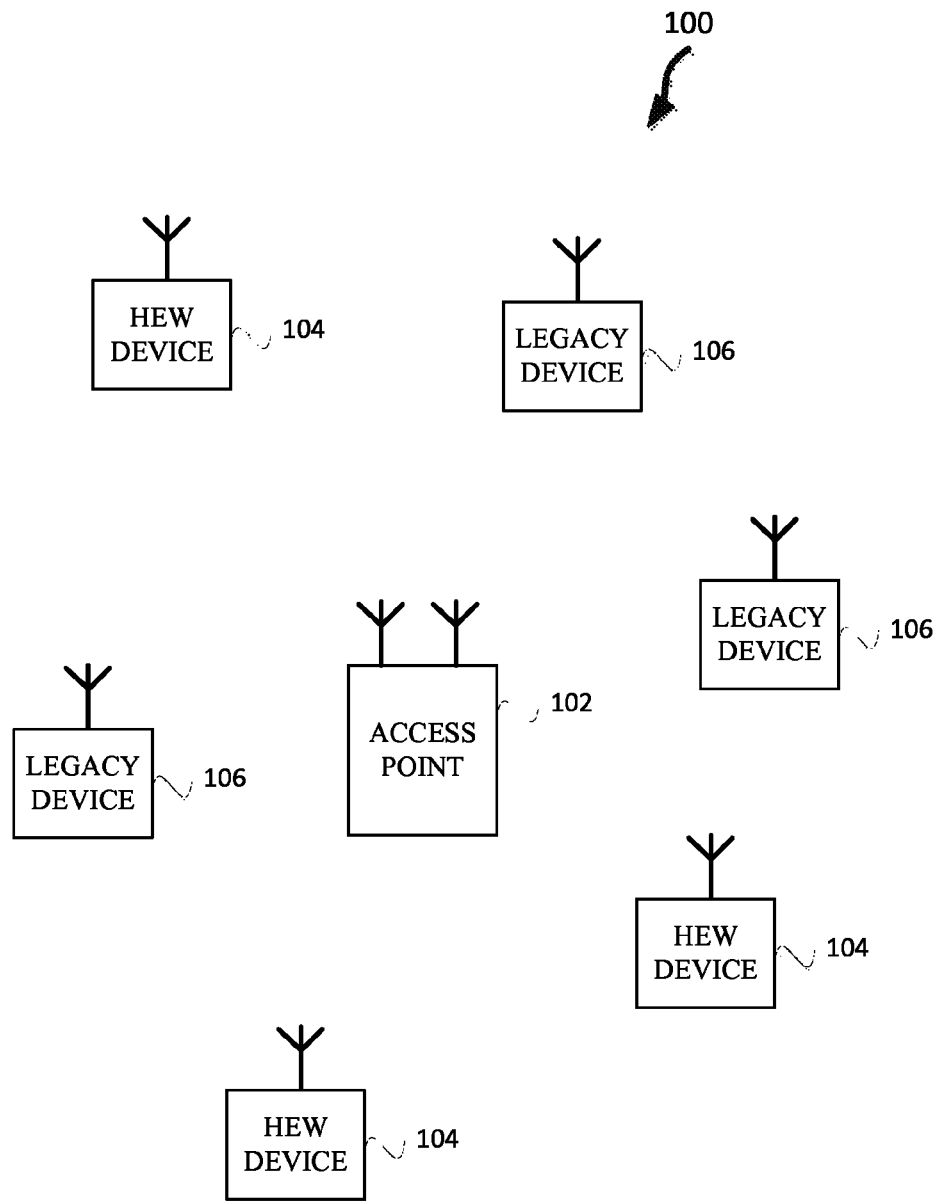
FIG. 1 illustrates a wireless network in accordance with some embodiments.

FIG. 1 illustrates a wireless network in accordance with some embodiments. The wireless network may comprise a basis service set (BSS) 100 that may include an access point (AP) 102, a plurality of HEW (e.g., IEEE 802.11ax) devices 104 and a plurality of legacy (e.g., IEEE 802.11n/ac) devices 106.

The AP 102 may be an access point (AP) using the 802.11 to transmit and receive. The AP 102 may be a base station. The AP 102 may use other communications protocols as well as the 802.11 protocol. For example the AP 102 may use DensiFi. The 802.11 protocol may be 802.11ax. The 802.11 protocol may include using Orthogonal Frequency-Division Multiple Access (OFDMA). The 802.11 may include using multi-user (MU) multiple-input and multiple-output (MIMO) (MU-MIMO).

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication techniques prior to IEEE 802.11ax.

In some embodiments, a HEW frame may be configurable to have a bandwidth of 20 MHz, 40 MHz, or a 80 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.03125 MHz, 2.5 MHz, 5 MHz and 10 MHz, or a combination thereof, may also be used. In these embodiments, an HEW frame may be configured for transmitting a number of spatial streams.

In other embodiments, the AP 102, HEW device 104, and/or legacy device 106 may implement different technologies such as CDMA2000, CDMA2000 1x, CDMA2000

EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)).

In example embodiments, the AP 102 and HEW devices 104 are configured to receive and send compressed MAC headers as disclosed in example embodiments in conjunction with FIGS. 2 through 9. In example embodiments, the AP 102 and HEW devices 104 are configured to receive and send compressed acknowledgement frames as disclosed in conjunction with FIGS. 2 through 9.

Figure 2:
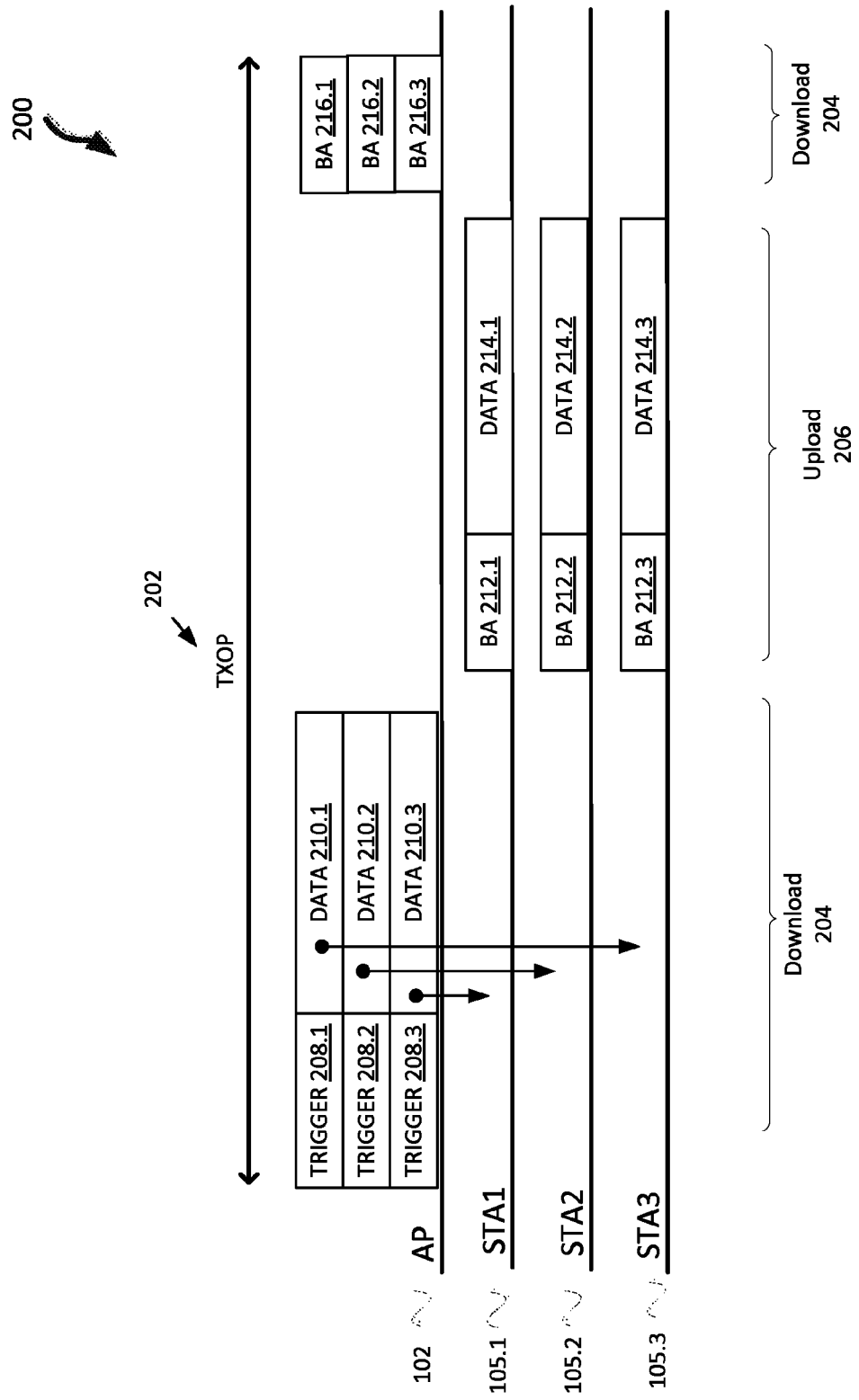
FIG. 2 illustrates a transmission operation (TXOP) according to example embodiments.

FIG. 2 illustrates a transmission operation (TXOP) 202 according to example embodiments. An AP 102 may send a trigger frame (or schedule) 208 and data 210 to each STA 105, which may be a HEW device 104, during a TXOP 202. The AP 102 may transmit the data 210 to the STA 105 on the frequency the STA 105 is allocated. The STA 105 may transmit to the AP 102, on the frequency the STA 105 is allocated, a block acknowledgement (BA) 212 and data 214. The AP 102 may send back BAs 216 to the STAs 105. The AP 102 and/or STA 105 may use compressed MAC headers during portions of the TXOP 202 as disclosed herein. In example embodiments, the AP 102 and/or STA 105 may use compressed MAC headers outside of a TXOP 202.

Figure 3:
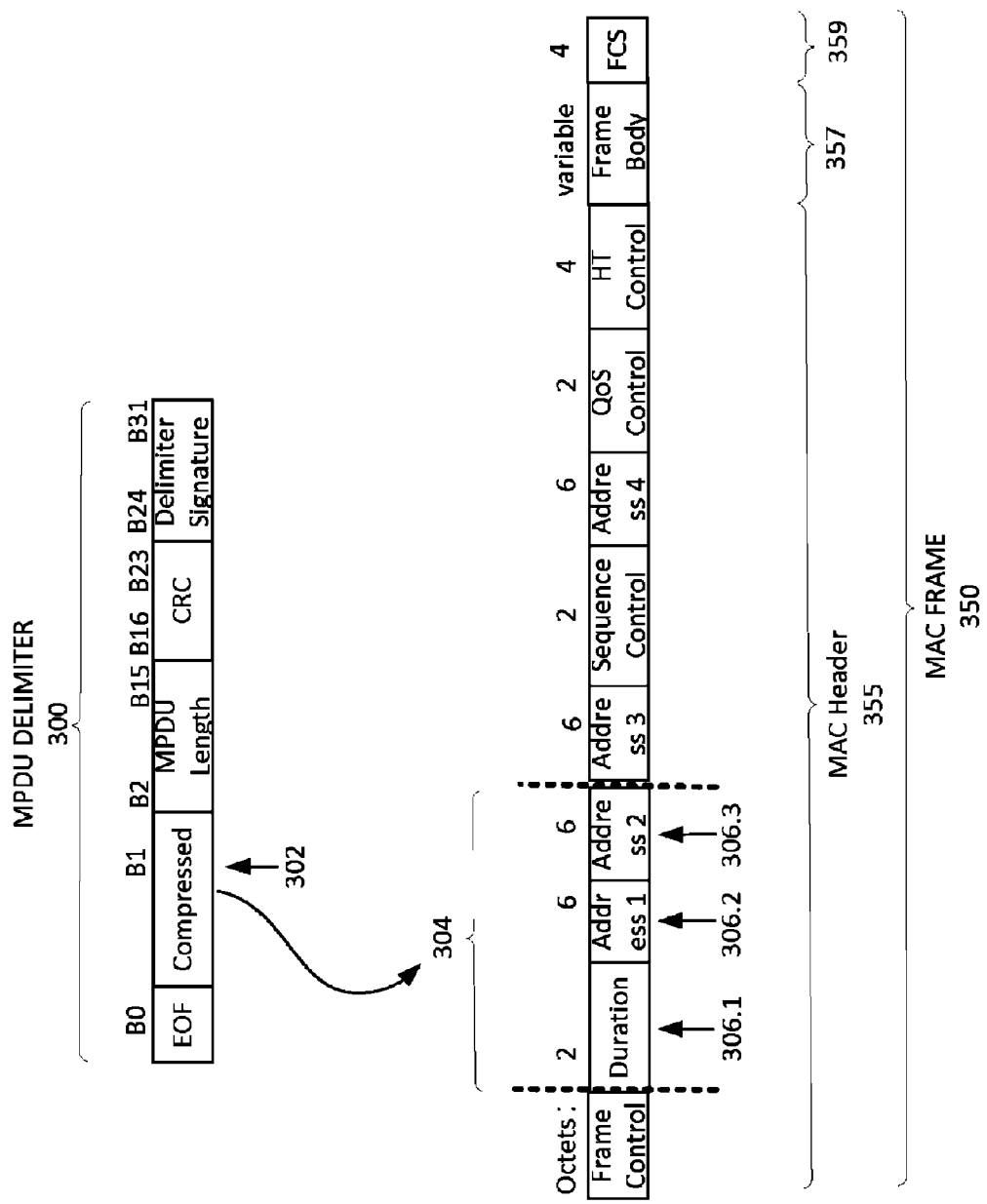
FIG. 3 illustrates a media access control (MAC) protocol data unit (MPDU) delimiter and a MAC frame according to example embodiments.

FIG. 3 illustrates a media access control (MAC) protocol data unit (MPDU) delimiter 300 and a MAC frame 350 according to example embodiments. The MPDU delimiter 300 may be sent between MAC frames 350. A compressed field 302 of the MPDU delimiter 300 may be used to indicate that a MAC header 355 may be compressed. The compressed field 302 may be a reserved field that is currently not being used for MPDU delimiters 300. Compressed field 302 may be bit B1. One skilled in the art would recognize that other fields or encodings could be used to indicate a compressed MAC frame 350 to follow the MPDU delimiter 300. In some embodiments, the use of compressed MAC headers 355 may be indicated in another way. For example, an information element may indicate that compressed MAC headers 355 will be used when appropriate.

The MAC frame 350 may include MAC header 355, frame body 357, and frame check sequence (FCS) 359. The MAC header 355 may be compressed by not including one or more fields 306 of the MAC header 355 such as the duration 306.1, address 1 306.2, and/or address 2 306.2. The compressed MAC header 355 would then not include one or more of the fields 306 of the MAC header 355 according to example embodiments.

The FCS 359 may be determined in the same manner as if the fields 306 were present. For example, the FCS 359 may have the same value whether or not the fields 306 are present. In example embodiments, an aggregate MPDU (A-MPDU) delimiter (e.g., 402 of FIG. 4) may indicate that there are more than one MAC frames 350 to follow.

In example embodiments, in a download from the AP 102 to the HEW device 104, the first frame in the A-MPDU would contain the full MAC header 355 with fields 306 included, and subsequent frames can omit one or more of the duration 306.1, address 1 306.2, and address 2 306.2. The duration 306.1 may be the same for subsequent frames so that the duration 306.1 may only be needed to be included in the first frame. In example embodiments, in an upload from the HEW device 104 to the AP 102, fields 306 that may be known by the AP 102 because of the scheduling process may be omitted. For example, during a TXOP 202 the AP 102 will know that address 1 306.2 is to the AP 102 and that address 2 is from the HEW device 104.

FIG. 4 illustrates two MAC frames 404, 414 and two MPDU delimiters 402, 412 according to example embodiments. Illustrated in FIG. 4 is an MPDU delimiter 402 that does not set the compression (compressed=0 405). For example, compressed=0 405 may be indicated by setting bit B1 to zero in MPDU delimiter 300. The first MAC frame 404, which may be a trigger frame (for example trigger frame 208), does not include a compressed MAC header (e.g., compressed=0 405). The duration 406, address 1 408, and address 2 410 fields are present in the MAC header 413, so it is uncompressed. The duration 406 may be the same for both MPDU delimiter 402 and MPDU delimiter 412 so that the duration 406 may be omitted in MPDU delimiter 412.

The second MPDU 412 does indicate a compressed MAC header 415 (e.g., compressed=1 407). For example, compressed=1 407 may be indicated by setting bit B1 to 1 in MPDU delimiter 300. The MAC frame 414 includes a MAC header 415 that is compressed, and the MAC header 415 does not include duration 406, address 1 408, or address 2 410 in contrast to the uncompressed MAC header 413. In example embodiments, a compressed MAC header 415 may omit different fields. The compressed MAC header 415 may not need the address 1 408, which may be a receiver address, and address 2 410, which may be a sender address. The receiver address and sender address may be known because the first MAC frame 404 begins a TXOP 202 (FIG. 2) so that the AP 102 and HEW device 104 or STA 105 know who the receiver and sender are since the AP 102 assigns a frequency and duration to the HEW device 104 or STA 105 in the trigger packet (which here is included in the first MAC frame 404).

FIG. 4 may illustrate a downlink MPDU, which reduces the overhead by 14 bytes by eliminating the address 1, address 2, and duration fields in the second MAC frame 414, although the scope of the embodiments is not limited in this respect.

FIG. 5 illustrates a block acknowledgement with a compressed MAC header 513 and data with a compressed MAC header 515, according to example embodiments. A first MPDU delimiter 502 indicates that the following MAC header 513 will be compressed (e.g., compressed=1 505). The first MAC frame 504 is a block acknowledgment (BA) with a compressed MAC header 513 (compressed=1). The first MAC frame 504 does not include the duration/ID, address 1, and address 2. The second MPDU 506 indicates (e.g., compressed=1 507) that the MAC header 515 is compressed. The second MAC frame 508 includes a compressed MAC header 515. The second MAC frame 508 does include the duration/ID, address 1, or address 2. FIG. 5 may be an uplink transmission during a TXOP 202 (FIG. 2) where the receiver address (address 1) and transmit address (address 2) are known to the AP 102 prior to demodulation because of the trigger frame, and the duration field is not needed, although the scope of the embodiments is not limited in this respect. The overhead may thus be reduced by 28 bytes by using compressed MAC headers 513, 515.

In example embodiments, in a downlink, the first frame in the MPDU would contain the full MAC header, and subsequent frames can omit some fields, such as one or more of the duration/ID, address 1, and address 2 fields. In the uplink, field contents are known by virtue of the scheduling process. The AP 102 may send a schedule, which indicates the HEW devices 104 allocation that may include a duration and frequency for the HEW devices 104 to use.

Figure 6:
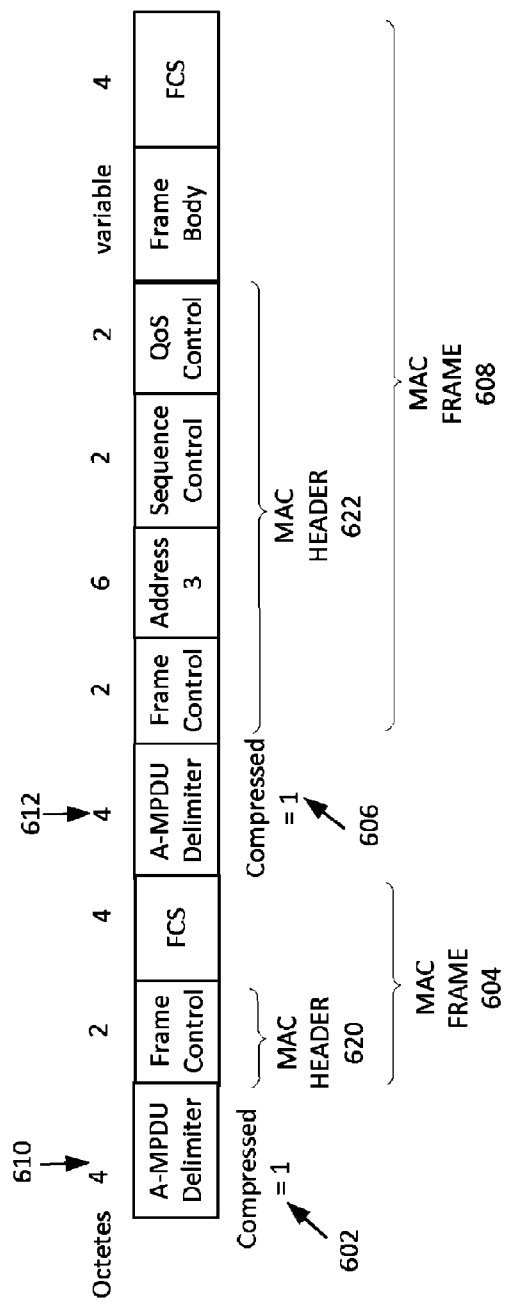
FIG. 6 illustrates an acknowledgment with a compressed MAC header and data with a compressed MAC header according to example embodiments.

FIG. 6 illustrates an acknowledgment with a compressed MAC header 620 and data with a compressed MAC header 622 according to example embodiments. The first MPDU delimiter 610 indicates that the following MAC header 620 is compressed. The first MAC frame 604 is an acknowledgment (ACK) with a compressed MAC header 620 (compressed=1 602). The first MAC frame 604 does not include the duration/ID, address 1, and address 2. The second MPDU 612 indicates that the following MAC header 622 is compressed (compressed=1 606). The second MAC frame 608 includes a compressed MAC header 622. The second MAC frame 608 does include the duration/ID, address 1, and address 2. The two MAC frames 604, 608 may be transmitted by a STA 105 or HEW device 104 during a TXOP 202 to an AP 102.

In example embodiments, if the AP 102 only sends a single data MPDU to the HEW device 104, the HEW device 104 can use an acknowledgment frame, which is shorter, (e.g., MAC frame 604) rather than a block acknowledgment frame (e.g., in the MAC frame 504). In example embodiments, the MAC frame 604 does not include the address 2 field.

Figure 7:
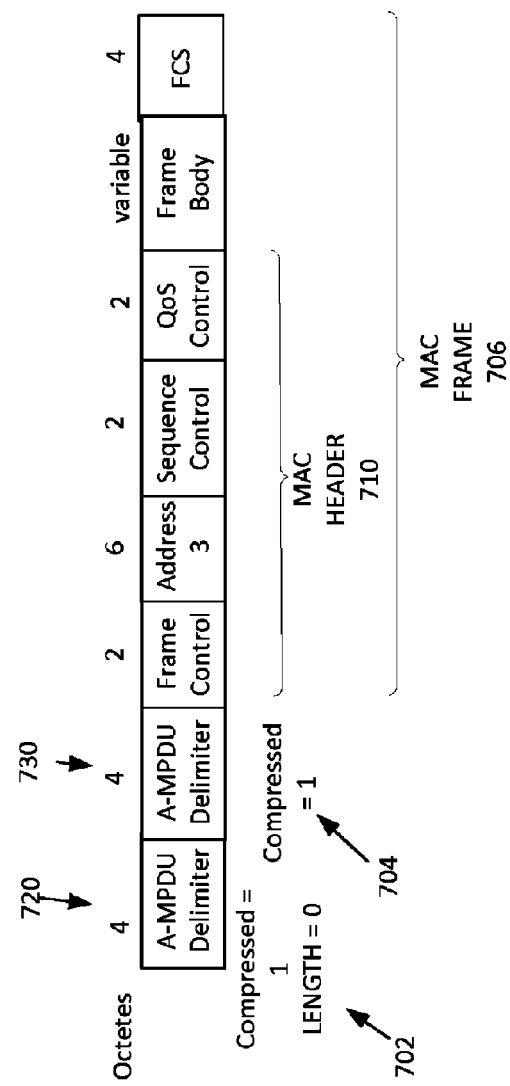
FIG. 7 illustrates a compressed acknowledgement and data with a compressed MAC header according to example embodiments.

FIG. 7 illustrates a compressed acknowledgement and data with a compressed MAC header 710 according to example embodiments. A first MPDU 720 may indicate that it is compressed and that MPDU length is 0 702, which may indicate the MPDU 720 is an acknowledgement frame. In example embodiments, an indication that the MAC header is compressed and a length of zero indicates that the MPDU 720 is an acknowledgement frame. The second MPDU delimiter 730 indicates that the MAC header 710 is compressed. The MAC frame 706 includes a compressed MAC header 710 where the duration/ID, address 1, and address 2 are not included. The compressed acknowledgement (e.g., MPDU 720) and data with a compressed MAC header 710 may be transmitted during a TXOP 202 from the STA 105 or HEW device 104 to the AP 102.

FIG. 8 illustrates a table 800 indicating the performance gain when overhead is reduced by 28 bytes for various data rates and payload durations according to example embodiments. By reducing the overhead using header compression, an advantage is gained in more efficient use of the wireless medium. For example, at a data rate of 1.5 million bits per second 802 in 1.5 milliseconds 804, 28 bytes (that may be saved by a compressed MAC header) may be 10% 806 of the total bytes sent.

In example embodiments, the compressed MAC headers and compressed acknowledgment may be implemented in hardware, firmware, or software where a deaggregation engine (not illustrated) may remove 14 bytes based on detecting that the MAC header is a compressed MAC header, and where an aggregation engine (not illustrated) inserts 14 bytes when the aggregation engine detects that a compressed MAC header was received. The aggregation and de-aggregation engines may have rules for acknowledgment removal or insertion for the compressed acknowledgement where the MPDU delimiter 720 (FIG. 7) may indicate a compressed MAC header and a length of zero.

The aggregation engine and de-aggregation engine may operate so that portions of the HEW device 104 and/or AP 102 do not need to be changed. The aggregation engine and de-aggregation engine may operation on packets queued to be transmitted or received so that other portions of the HEW device 104 and/or AP 102 may operate on MAC frames without any special handling of the compressed MAC headers and/or compressed acknowledgements.

Figure 9:
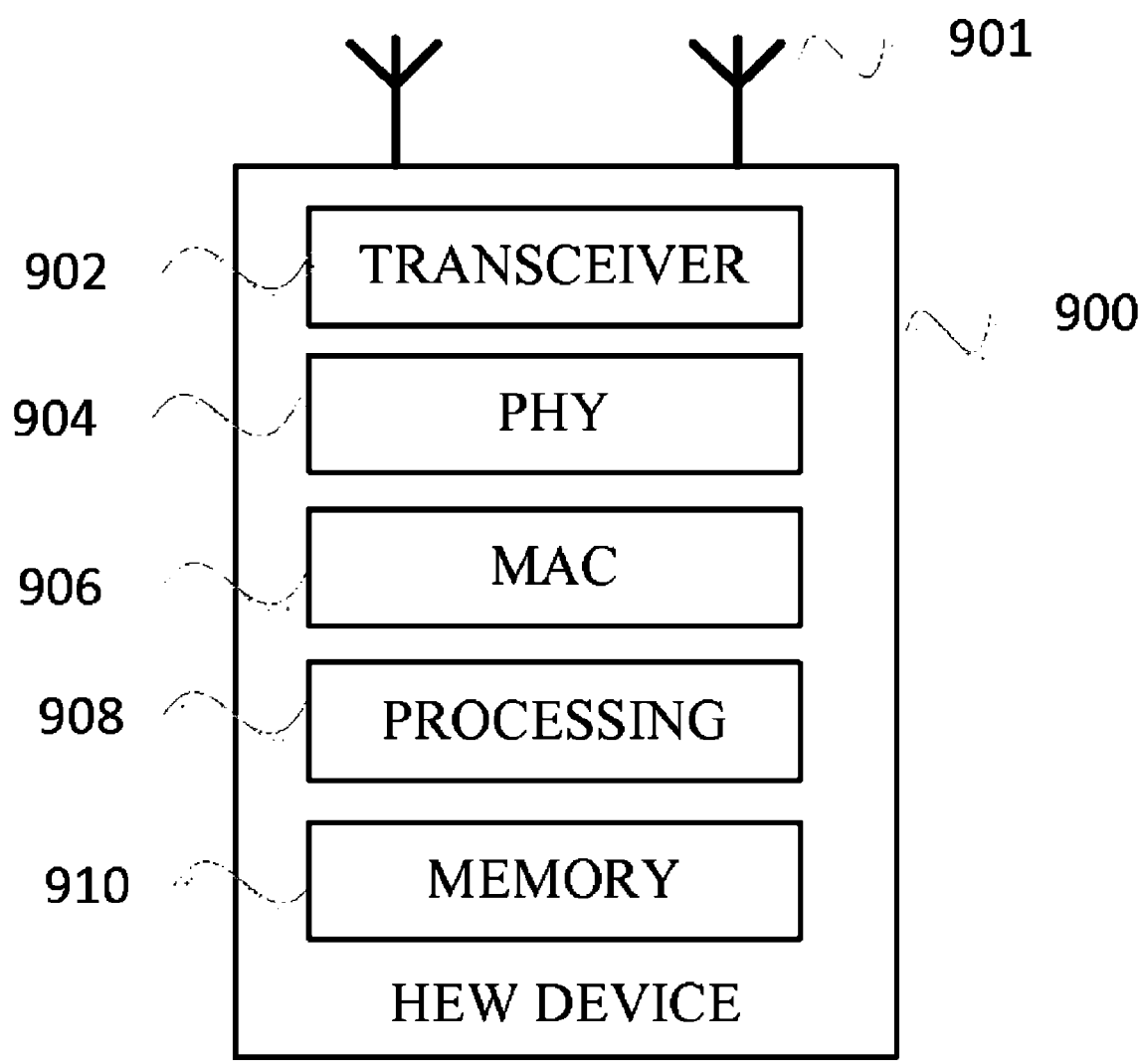
FIG. 9 illustrates a HEW device according to example embodiments.

FIG. 9 illustrates a HEW device 900 according to example embodiments. HEW device 900 may be an HEW-compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 900 may be suitable for operating as access point 102 (FIG. 1) or an HEW device 104 (FIG. 1). In accordance with embodiments, HEW device 900 may include, among other things, a transmit/receive element 901 (for example an antenna), a transceiver 902, physical layer (PHY) circuitry 904 and medium-access control layer circuitry (MAC) 906. PHY 904 and MAC 906 may be HEW compliant layers and may also be compliant with one or more legacy IEEE 802.11 standards. MAC 906 may be arranged to configure PPDUs and arranged to transmit and receive PPDUs, among other things.

HEW device 900 may also include other hardware processing circuitry 908 and memory 910 configured to perform the various operations described herein. The processing circuitry 908 may be coupled to the transceiver 902, which may be coupled to the transmit/receive element 901. While FIG. 9 depicts the processing circuitry 908 and the transceiver 902 as separate components, the processing circuitry 908 and the transceiver 902 may be integrated together in an electronic package or chip. The processing circuitry 908 may include the deaggregation engine and the aggregation engine.

In some embodiments, the MAC 906 may be arranged to contend for a wireless medium during a contention period to receive control of the medium for the HEW control period and configure an HEW PPDU. In some embodiments, the MAC 906 may be arranged to contend for the wireless medium based on channel contention settings, a transmitting power level, and a CCA level.

The PHY 904 may be arranged to transmit the HEW PPDU. The PHY 904 may include circuitry for modulation/demodulation, upconversion/downconversion, filtering, amplification, etc. In some embodiments, the hardware processing circuitry 908 may include one or more processors. The hardware processing circuitry 908 may be configured to perform functions based on instructions being stored in a RAM or ROM, or based on special purpose circuitry. In some embodiments, the hardware processing circuitry 908 may be configured to perform one or more of the functions described herein in conjunction with FIGS. 1-8 such as sending and receiving compressed MAC headers, MPDU delimiters that indicate compressed headers, and compressed acknowledgements in MPDU delimiters.

In some embodiments, two or more antennas 901 may be coupled to the PHY 904 and arranged for sending and receiving signals including transmission of the HEW packets. The HEW device 900 may include a transceiver 902 to transmit and receive data such as HEW PPDU and packets that include an indication that the HEW device 900 should adapt the channel contention settings according to settings included in the packet. The memory 910 may store information for configuring the other circuitry to perform operations for configuring and transmitting HEW packets and performing the various operations described herein in conjunction with FIGS. 1-7 such as transmitting and receiving compressed MAC headers and compressed acknowledgements and block acknowledgments.

In some embodiments, the HEW device 900 may be configured to communicate using OFDM communication signals over a multicarrier communication channel. In some embodiments, HEW device 900 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect as the HEW device 900 may also be suitable to transmit and/or receive communications in accordance with other techniques and standards. In some embodiments, the HEW device 900 may use 4× symbol duration of 802.11n or 802.11ac.

In some embodiments, an HEW device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas 901 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a high-efficiency wireless local-area network (HEW) device including circuitry. The circuitry may be configured to: transmit a media access control (MAC) protocol data unit (MPDU) delimiter with a field that indicates a subsequent MAC header is a compressed MAC header; and transmit a compressed MAC frame with the compressed MAC header.

In Example 2, the subject matter of Example 1 can optionally include where the field that indicates the subsequent MAC header is the compressed MAC header is bit 1 (B1).

In Example 3, the subject matter of Example 1 can optionally include where the field that indicates the subsequent MAC frame is the compressed MAC header is a bit from a group of reserved bits.

In Example 4, the subject matter of any of Examples 1-3 can optionally include where the circuitry of the HEW device is arranged to configure the MAC frame to include the compressed header, and wherein the compressed MAC header does not include one or more fields of the following group: duration, receive address, and sender address.

In Example 5, the subject matter of any of Examples 1-4 can optionally include where the circuitry of the HEW device is arranged to configure the MAC frame to include the compressed MAC header, and where the compressed MAC header includes frame control, sequence control and quality of service control.

In Example 6, the subject matter of any of Examples 1-5 can optionally include where the circuitry is further configured to receive a packet from a second HEW device; and transmit a second MPDU delimiter with a field that indicates the subsequent MAC header is a compressed MAC header with a length field that indicates zero to indicate that the second MPDU delimiter is an acknowledgment of the received packet.

In Example 7, the subject matter of any of Examples 1-6 can optionally include where the circuitry is further configured to transmit the MPDU delimiter that indicates the subsequent MAC header is a compressed MAC header if the circuitry is operating in a transmission opportunity.

In Example 8, the subject matter of any of Examples 1-7 can optionally include where the circuitry is further configured to transmit the MPDU delimiter that indicates the subsequent MAC header is a compressed MAC header if the circuitry can determine that a second HEW device can determine a receive address field and a sender address field without the receive address field and the sender address field included in the MAC header.

In Example 9, the subject matter of any of Examples 1-8 can optionally include where the circuitry is further configured to: receive a schedule in a transmission opportunity; receive a second compressed MAC frame; and determine that a receive address field is an address of the HEW device based on the schedule and determine that a receive address field is an address of an access point that transmitted the schedule based on the schedule.

In Example 10, the subject matter of any of Examples 1-8 can optionally include where the circuitry is further configured to: transmit a schedule to initiate a transmission opportunity to a second HEW device; receive a second compressed MAC frame; and determine that a receive address field is an address of the HEW device based on the schedule and determine that a sender address field is an address of the second HEW device based on the schedule.

In Example 11, the subject matter of any of Examples 1-10 can optionally include where the circuitry is further configured to: transmit a second MPDU delimiter that is not compressed before the MPDU delimiter.

In Example 12, the subject matter of Example 11 can optionally include where the circuitry is further configured to: transmit a schedule for a transmission opportunity after the second MPDU delimiter.

In Example 13, the subject matter of any of Examples 1-12 can optionally include an aggregation engine configured to remove bytes that correspond to fields not included in the compressed MAC frame, and where the transmitting of the compressed MAC frame further comprises: sending an uncompressed MAC frame to the aggregation engine. Example 13 may further include a deaggregation engine configured to insert bytes into a received compressed MAC frame that correspond to fields not included in the compressed MAC frame.

In Example 14, the subject matter of any of Examples 1-13 can optionally include memory coupled to the circuitry.

In Example 15, the subject matter of Examples 13 can optionally include one or more antennas coupled to the circuitry.

Example 16 is a method performed by a high-efficiency wireless local-area network (HEW) device. The method may include transmitting a media access control (MAC) protocol data unit (MPDU) delimiter with a field that indicates a subsequent MAC header is a compressed MAC header; and transmitting a compressed MAC frame with the compressed MAC header.

In Example 17, the subject matter of Examples 16 can optionally include where the field that indicates the subsequent MAC frame is the compressed MAC header is a bit from a group of reserved bits.

In Example 18, the subject matter of Examples 16 can optionally include where the compressed MAC header does not include one or more of the following group: duration, receive address, and receive address.

In Example 19, the subject matter of any of Examples 16-18 can optionally include receiving a packet from a second HEW device; and transmitting a second MPDU delimiter with a field that indicates the subsequent MAC header is a compressed MAC header with a length field that indicates zero to indicate that the second MPDU delimiter is an acknowledgment of the received packet.

In Example 20, the subject matter of any of Examples 16-19 can optionally include where transmitting the MPDU delimiter includes transmitting the MPDU delimiter during a transmission opportunity.

In Example 21, the subject matter of any of Examples 16-20 can optionally include receiving a schedule in a transmission opportunity; receiving a second compressed MAC frame; and determining that a receive address field is an address of the HEW device based on the schedule and determining that a receive address field is an address of an access point that transmitted the schedule based on the schedule.

In Example 22, the subject matter of any of Examples 16-20 can optionally include transmitting a schedule to initiate a transmission opportunity to a second HEW device; receiving a second compressed MAC frame; and determining that a receive address field is an address of the HEW device based on the schedule and determine that a sender address field is an address of the second HEW device based on the schedule.

Example 23 is a non-transitory computer-readable storage medium that stores instructions for execution by one or more processors to perform operations for sending and receiving compressed media access control headers on a wireless communication device, the instructions to configure the one or more processors to cause the wireless communication device to: transmit a media access control (MAC) protocol data unit (MPDU) delimiter with a field that indicates a subsequent MAC header is a compressed MAC header; and transmit a compressed MAC frame with the compressed MAC header.

In Example 24, the subject matter of Example 23 can optionally include where the field that indicates the subsequent MAC frame is the compressed MAC header is bit 1 (B1).

In Example 25, the subject matter of Examples 25 can optionally include where the compressed MAC header does not include one or more of the following group: duration, receive address, and receive address.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless device, the apparatus comprising: memory; and, processing circuitry coupled to the memory, the processing circuitry configured to:
   configure the HE wireless device to transmit a media access control (MAC) protocol data unit (MPDU) delimiter with a field that indicates a next MAC frame includes a compressed MAC header; and
   configure the HE wireless device to transmit the next MAC frame with the compressed MAC header, the compressed MAC header to include the frame control field and sequence control field and to exclude one or more of the duration field, receive address field, and sender address field.

2. The apparatus of claim 1, wherein the field that indicates the next MAC frame includes the compressed MAC header is bit 1 (B1).

3. The apparatus of claim 1, wherein the field that indicates the next MAC frame includes the compressed MAC header is a bit from a group of reserved bits.

4. The apparatus of claim 1, wherein the processing circuitry is further configured to:
   receive a packet from a second HEW device; and
   transmit a second MPDU delimiter with a field that indicates the next MAC frame includes a compressed MAC header with a length field that indicates zero to indicate that the second MPDU delimiter is an acknowledgment of the received packet.

5. The apparatus of claim 1, wherein the processing circuitry is further configured to transmit the MPDU delimiter that indicates the next MAC frame includes a compressed MAC header if the circuitry is operating in a transmission opportunity.

6. The apparatus of claim 1, wherein the processing circuitry is further configured to transmit the MPDU delimiter that indicates the next MAC frame includes a compressed MAC header if the processing circuitry can determine that a second HE wireless device can determine a receive address field and a sender address field without the receive address field and the sender address field included in the MAC header.

7. The apparatus of claim 1, wherein the processing circuitry is further configured to:
   receive a schedule in a transmission opportunity;
   receive a second MAC frame with the compressed MAC header; and
   determine that a receive address field is an address of the HE wireless device based on the schedule and determine that a receive address field is an address of an access point that transmitted the schedule based on the schedule.

8. The apparatus of claim 1, wherein the processing circuitry is further configured to:
   transmit a schedule to initiate a transmission opportunity to a second HE wireless device;

receive a second MAC frame with the compressed MAC header; and determine that a receive address field is an address of the HE wireless device based on the schedule and determine that a sender address field is an address of the second HE wireless device based on the schedule.

9. The apparatus of claim 1, wherein the processing circuitry is further configured to:

transmit a second MPDU delimiter that is not compressed before the MPDU delimiter.

10. The apparatus of claim 9, wherein the processing circuitry is further configured to:

transmit a schedule for a transmission opportunity after the second MPDU delimiter.

11. The apparatus of claim 1, further comprising:

an aggregation engine configured to remove bytes that correspond to fields not included in the next MAC frame with the compressed MAC header, wherein the transmitting of the next MAC frame with the compressed MAC header further comprises:

sending an uncompressed MAC frame to the aggregation engine; and a deaggregation engine configured to insert bytes into a received compressed MAC frame with the compressed MAC header that correspond to fields not included in the compressed MAC frame.

12. The apparatus of claim 1, further comprising transceiver circuitry coupled to the memory.

13. The apparatus of claim 12, further comprising one or more antennas coupled to the transceiver circuitry.

14. A method performed by an apparatus of a high-efficiency (HE) wireless device, the method comprising:

configuring the HE wireless device to transmit a media access control (MAC) protocol data unit (MPDU) delimiter with a field that indicates a next MAC frame includes a compressed MAC header; and configuring the HE wireless device to transmit the next MAC frame with the compressed MAC header, the compressed MAC header to include the frame control field and sequence control field and to exclude one or more of the duration field, receive address field, and sender address field.

15. The method of claim 14, wherein the field that indicates the next MAC frame includes the compressed MAC header is a bit from a group of reserved bits.

16. The method of claim 14, further comprising:

receiving a packet from a second HE wireless device; and transmitting a second MPDU delimiter with a field that indicates a MAC frame after the second MPDU delimiter includes the compressed MAC header with a length field that indicates zero to indicate that the second MPDU delimiter is an acknowledgment of the received packet.

17. The method of claim 14, wherein transmitting the MPDU delimiter further comprises:

transmitting the second MPDU delimiter during a transmission opportunity.

18. The method of claim 14, the method further comprising:

receiving a schedule in a transmission opportunity;

receiving a second compressed MAC frame; and determining that a receive address field is an address of the HE wireless device based on the schedule and determining that a receive address field is an address of an access point that transmitted the schedule based on the schedule.

19. The method of claim 14, the method further comprising:

transmitting a schedule to initiate a transmission opportunity to a second HEW device;

receiving a second compressed MAC frame; and determining that a receive address field is an address of the HE wireless device based on the schedule and determine that a sender address field is an address of the second HE wireless device based on the schedule.

20. A non-transitory computer-readable storage medium that stores instructions for execution by one or more processors to perform operations for sending and receiving compressed media access control headers on an apparatus of a wireless communication device, the instructions to configure the one or more processors to cause the apparatus to:

transmit a media access control (MAC) protocol data unit (MPDU) delimiter with a field that indicates a subsequent MAC header is a compressed MAC header; and transmit a compressed MAC frame with the compressed MAC header, wherein the compressed MAC header does not include one or more fields of the following group: duration, receive address, and sender address, and wherein the compressed MAC header includes frame control and sequence control.

21. The non-transitory computer-readable storage medium of claim 20, wherein the field that indicates the next MAC frame includes the compressed MAC header is bit 1 (B1).

* * * * *